United States Patent Office 3,427,364
Patented Feb. 11, 1969

3,427,364
REACTION OF LITHIUM-TERMINATED POLYMERS WITH CARBON MONOXIDE
Alfred W. Shaw, Moraga, Charles H. Wilcoxen, Jr., San Lorenzo, and Frank D. Mango, Oakland, Calif., assignors to Shell Oil Company, New York, N.Y., a corporation of Delaware
No Drawing. Filed Mar. 26, 1965, Ser. No. 443,066
U.S. Cl. 260—879   7 Claims
Int. Cl. C08f 27/00, 7/04; C08d 5/04

ABSTRACT OF THE DISCLOSURE

A process for the preparation of polymers of increased molecular weight by reacting lithium terminated homopolymers and copolymers of conjugated dienes and monovinyl arenes with carbon monoxide as a coupling agent. The process is conducted at a temperature of from 0 to 75° C. with from 0.5 to 25 equivalents of carbon monoxide per equivalent of lithium.

---

This invention relates to polymers of increased molecular weight prepared by reacting terminally reactive polymers with carbon monoxide. In one aspect, the invention relates to solid polymers prepared by heating polymers terminated with alkali metal ions with carbon monoxide whereby coupling of polymer chains occurs.

The term "terminally reactive polymer," as used herein, designates a polymer which contains a reactive charge or group at one or both ends of a polymer chain and/or at the terminal ends of branches dependent from the main chain.

The process of preparing polymers of vinylidene compounds, as more particularly defined hereinafter, may take place by a wide variety of catalytic environments dependent in part upon the end product desired and the monomers utilized. It has been found that a certain lack of control may occur in attaining a desired molecular weight or molecular weight spread in a final product if polymerization is allowed to proceed until this estimated molecular weight is attained. Closer control over molecular weight may often be obtained by a so-called "coupling process" wherein polymer chains of lower molecular weight terminated with a suitable charge or radical are coupled together by the use of certain coupling agents. For example, it is possible to polymerize conjugated dienes or vinyl arenes with an organo alkali metal catalyst to form polymer chains terminated with an alkali radical, this polymer then being referred to as a "living polymer." These living polymers may then be coupled, for example, by the use of a polyfunctional halogen compound forming an alkali metal halide by-product and coupling two or more of the living polymer chains together by means of the organic residue of the halogen compound.

For many purposes, such coupling procedures may be satisfactory. However, for other purposes, the use of halogen coupling agents leaves much to be desired. For example, in the coupling of high molecular weight living polymers of conjugated dienes and/or vinyl arenes terminated with an alkali metal such as lithium, and coupling with a di-halogen coupling agent, it has been found that for some unexplained reason coupling occurs only to a certain extent, a substantial fraction of the uncoupled product remaining in the final reaction mixture. The reason for this is not clear at the present time, but may be due to thermal termination of the living polymer chains to a certain extent, to impurities which consume a part of the coupling agent, or to other reasons as yet undetermined. For many purposes, it is highly desirable to obtain a completely coupled product or one which is as nearly completely coupled as possible. The reasons for this are directly related to the physical properties of the resulting products. If the coupled reaction mixture contains more than a small residue of uncoupled polymer, the stress-strain properties of the resulting composition are sharply reduced. Hence, for many purposes it is highly desirable to obtain if, possible, a reaction mixture in which a maximum of coupling has occurred.

It is an object of the present invention to provide improved polymer compositions. It is a particular object of the invention to provide an improved process for the preparation of polymers. It is a specific object of the invention to provide an improved process for the coupling of living polymer chains. Other objects will become apparent during the following detailed description of the invention.

Now, in accordance with the present invention, a process is provided for the preparation of polymers of increased molecular weight which comprises reacting at a temperature in the range of 0 to 75° C., a terminally reactive polymer having a general configuration $P(Y)_n$, wherein P comprises a polymer of polymerizable vinylidene compounds, Y is a terminally positioned alkali metal radical and $n$ is an integer of 1 to 4, with carbon monoxide in a ratio of 0.5 to 25 equivalents of carbon monoxide per equivalent of alkali metal. The process of the present invention permits coupling of more than 90% and usually of more than 95% of terminally reactive polymers to form coupled products having at least double the average molecular weight of the intermediate living polymer chains. The invention is especially applicable to polymer chains terminated with lithium and particularly to polymer chains terminated at only one end with a lithium radical.

The monomers which can be employed in the preparation of polymers containing terminal alkali metal atoms include a wide variety of materials. The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as halogenated dienes, e.g., chloroprene, fluoroprene, etc. Of the conjugated dienes the preferred material is butadiene, with isoprene also being especially suitable.

In addition to the conjugated dienes other monomers which can be employed are aryl-substituted olefins, e.g., monovinyl arenes as styrene, various alkyl styrenes, paramethoxystyrene, vinylnaphthalene, vinyltoluene, and the like; heterocyclic nitrogen-containing monomers, such as pyridine and quinoline derivatives containing 1 vinyl or alpha-methyl-vinyl group, such as 2-vinylpyridine, 3-vinylpyridine, 4-vinylpyridine, 3-ethyl-5-vinylpyridine, 2-methyl - 5 - vinylpyridine, 3,5-diethyl-4-vinylpyridine, etc.; similar monoalkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.

The above compounds in addition to being polymerizable alone are also copolymerizable with each other to form terminally reactive polymers. In addition, copolymers can be prepared using minor amounts of copolymerizable monomers containing more than one vinylidene group such as 2,4-divinyl-pyridine, divinylbenzene, 2,3-divinylpyridine, 3,5-divinylpyridine, 2,4-divinyl-6-methylpyridine, 2,3-divinyl-5-ethylpyridine, and the like.

The termnally reactive polymers in addition to including homopolymers of polymerizable vinylidene compounds and random copolymers of conjugated dienes with vinylidene compounds also include block copolymers, which are formed by polymerizing a monomer onto the end of a polymer, the monomer being introduced in such a manner that substantially all of the co-reacting molecules enter the polymer chain at this point. In general, the block copolymers can include combinations of homopolymers and copolymers of the materials hereinbefore set forth. The general process comprises the steps of initially contacting a monomer selected from those included in the above types with an organo-lithium compound in the presence of a diluent selected from the group consisting of aromatic, paraffinic and cycloparaffinic hydrocarbons so as to form a polymer block; and after polymerization of substantially all of the selected monomer, contacting the living polymer block terminated with a lithium radical (represented by A–Li) with another monomer selected from those included in above groups, the monomer selected being different from the monomer employed in the initial contacting. Polymerization is continued to form a living block copolymer A–B–Li.

The amount of initiator which can be used will vary depending on the polymer prepared, and particularly the molecular weight desired. Usually the terminally reactive polymers are liquids, having molecular weights in the range of 1,000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles (preferably 1–30) per 100 grams of monomer.

Formation of the termially reactive polymers is generally carried out in the range of between −100 and +100° C., preferably between −75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. It is preferred that the polymerization be carried out in the presence of a suitable diluent, such as benzene, toluene, cyclohexane, methylcyclohexane, xylene, n-butane, n-heptane, isopentane, isooctane, or mixtures thereof, and the like. Generally, the diluent is selected from hydrocarbon, e.g., paraffins, cycloparaffins, and aromatics containing from 4 to 10 carbon atoms per molecule. Lithium alkyls are preferred as initiators in the polymerization reaction since a very large perecntage of the polymer molecules formed contain a single terminal reactive group, and also the polymerization can be carried out at normal room temperature or within about 35° above or below it. Suitable alkyl lithiums include isopropyl lithium, n-butyl lithium, sec-butyl lithium, n-amyl lithium, sec-amyl lithium, etc. This is not to say, however, that other organo alkali metal initiators cannot be employed; however, usually more specialized opertaion or treatment is required with these materials, including low reaction temperatures.

The process of the present invention is especially applicable to the coupling of block copolymers preferably formed from conjugated dienes and vinyl arenes or from two different conjugated dienes. More specifically, the vinyl arene is preferably styrene while the conjugated diene is either butadiene or isoprene. While it is possible to utilize the process of the present invention in the coupling of polymer chains terminated at two or more terminal positions with alkali metal radicals, the preferred process comprises the preparation of the living block copolymer precursors by the use of lithium alkyl catalyst to form precursor block copolymer A–B–Li. The solution of this intermediate living block copolymer is then subjected to the process of the present invention, namely, coupling by means of introduction of carbon monoxide under the stated conditions of the coupling process. The primary condition is that of temperature (0–75° C.), the time of coupling being variable with the specific temperature and living block copolymer being so treated. Normally, this will be very rapid and will occur to an extent of over 90% of the intermediate in a space of time from about 15 seconds to about 30 minutes.

While the exact course of the coupling process is at present unclairified, it is presumed that at the point of coupling one or more ketone radicals is present in the polymer chain. In the description of the coupled products, these somewhat questionable ketone radicals may be ignored. Therefore, the desired coupled products found in such high yield in the process of this invention can be said to include particularly the following:

polystyrene-polybutadiene-polystyrene
polystyrene-polyisoprene-polystyrene
polyisoprene-polystyrene-polyisoprene
polybutadiene-polystyrene-polyisoprene
polyisoprene-polybutadiene-polyisoprene
polybutadiene-polyisoprene-polybutadiene While these are the simplest types of block copolymers contempltaed in accordance with the present invention, it will be understood that block copolymers of greater numbers of blocks may be formed by coupling the precursor living block copolymers wherein more than one terminal of the chain is associated with an alkali metal radical. Moreover, it will be understood that the process contemplates separately preparing precursor living block copolymers of more than one type of monomer, thereafter mixing the types and subsequently coupling them by means of carbon monoxide. Hence, heteric mixture of the precursor polymer blocks may thus be formed.

It has been found that carbon monoxide is apparently unique in the unexpectedly high yield of coupled products obtained by its use. Under similar conditions, carbon dioxide and transition metal carbonyls such as molybdenum carbonyl, alkyl iron carbonyls, ion carbonyl, etc., may be used in coupling procedures but up to the present time the "efficiency" of such materials is no better than that obtained by the use of dihalogen coupling agents. In the case of the block copolymers with which this invention is especially concerned, carbon monoxide causes a coupling of at least 90% of the living block copolymers so treated as compared with 70–75% when the coupling agent is either carbon dioxide, a metal carbonyl or a dihalogen coupling agent. Thus, the use of carbon monoxide effects a result which is outstanding and results in a product having superior physical properties.

The coupling may be carried out in the same or different solvent from that utilized in the preceding polymerization step whereby the living polymer precursor has been formed. While it is possible to utilize ethers such as dialkyl ethers or tetrahydrofuran as polymerization media, this is often undesirable particularly when conjugated dienes are being polymerized if a high cis-1,4-content of the conjugated diene polymer block is desired. Consequently, it is a preferred procedure to utilize as the polymerization medium one or more hydrocarbons such as pentanes, pentenes, hexanes, cyclohexanes, benzene, xylene, and mixtures thereof. Mixtures are especially preferred when block copolymers are being formed from two dissimilar monomers, such as styrene and a conjugated diene, wherein one or the other polymer blocks formed from one of these monomers has a sharply reduced solubility in a single solvent. Consequently, it is preferred that mixtures of aliphatic solvents and cyclo-aliphatic or aromatic solvents be employed in the formation of block copolymers. A specific case in point is the combination of cyclohexane with mixed pentanes or pentenes, the ratio of solvent components being adjusted so that the block copolymer is reasonably soluble therein. Of course, this solubility will vary with the proportions of the individual polymer blocks which may be present.

In describing the process of the present invention in general terms concerning the preferred aspects thereof, the living block copolymer may be formed in a hydrocarbon system to form a block copolymer terminated with a lithium radical and having the general configuration P–Li. Without any substantial further change, carbon monoxide is introduced into the system at temperatures between 0–75° C., (preferably between 15–650° C.) in an amount between 0.5 and 25 equivalents of carbon monoxide per equivalent of lithium radical, preferably between 0.75 and 15 equivalents of carbon monoxide. Coupling rapidly takes place to form a coupled polymer presumably having one or several ketone radicals in the center thereof but which may be ignored for all practical purposes. The coupled polymer forms a cement with the hydrocarbon solvent in which the living polymer was dissolved during the coupling process. On the other hand, if preferred, it may be coagulated such as injection of steam, or steam and hot water, preferably under pressure, to form a crumb of the coupled polymer from which the solvent is flashed or rapidly evaporated. The coagulated polymer crumb is conveniently collected in a water bath from which water is drained and the crumb dried by air or in a heat controlled oven.

The coupled polymer prepared by the preferred process wherein the living polymer has a single alkali metal terminal is formed to be at least 90% of the final product, the remainder being uncoupled precursor polymer which for some unknown reason did not take part in the coupling process. Normally, at least 93–97% of the polymer will be coupled, thus, indicating that substantially complete reaction has in fact occurred. The extent of coupling may be followed with reasonable accuracy by molecular weight determinations which may be found by a predetermined relationship between intrinsic viscosity and osmotic molecular weight or by tritium counting procedures.

The process is not only useful for the preparation of coupled block copolymers, but also may be utilized for allied purposes such as the preparation of high impact polystyrene.

The polymer products which are preferably the block copolymers, may be either of a thermoplastic nature or elastomeric depending upon the specific monomers employed and the weight ratio thereof. As the conjugated diene polymer block increases in proportion, the products become more elastomeric while the thermoplastic properties are increased by raising the proportion of monovinyl arenes employed in the formation of vinyl arene polymer blocks. Within certain ratios, it has been found possible to produce elastomeric block copolymers by this coupling procedure which may be described as "self-vulcanizing" having in this case the special definition that the coupled polymers have the properties of a vulcanized rubber without the necessity for further heating, reaction, or crosslinking thereof. This is especially true when in the coupled product the monovinyl arene polymer blocks form two terminal blocks with a center block of a conjugated diene polymer of which the favored types are polystyrene - polyisoprene - polystyrene and polystyrene - polybutadiene-polystyrene. The self-curing features are most evident when the polyvinyl arene blocks each have average molecular weights between about 5,000 and 40,000 and the center conjugated diene polymer block has a total molecular weight in the coupled product of between about 35,000 and 150,000.

In certain instances it may be desirable to leave in the final reaction mixture a minor but effective amount of the precursor to the coupled product for specific purposes. For instance, the presence of 5–30% by weight of the precursor living polymer in reaction mixture wherein the remainder comprises 95–70% by weight of the coupled product will be found to have improved processability even though the stress-strain properties of the entire mixture may not be as great as if substantially the entire living block copolymer precursor had been coupled. Where the end use contemplated does not require the maximum of stress-strain properties, it is therefore possible to produce a product having improved processability by restricting the proportion of carbon monoxide utilized in the coupling step.

The following examples illustrate the process of the present invention.

EXAMPLE I

Polymerization of styrene in cyclohexane was effected by the use of secondary butyl lithium to form a first polymer block having the structure polystyrene-Li, the average molecular weight being 4,700. After consumption of the styrene, isoprene was injected into the system and block polymerization occurred with the first living polymer block to form the intermediate living block copolymer polystyrene-polyisoprene-Li, wherein the polyisoprene block had an average molecular weight of 23,000. The resulting solution comprised 11% by weight of the living polymer block, 89% by weight of cyclohexane. The temperature of the solution was maintained at about 25° C. while carbon monoxide was injected in a total proportion of about 20 equivalents of carbon monoxide per equivalent of lithium radical. At the end of 60 minutes, it was found that about 95% by weight of the living polymer block S–I–Li had coupled to form the coupled product S–I–IS. Essentially, the same results were obtained when the temperature of coupling was raised to 40° C., the time of coupling being 60 minutes and the ratio of carbon monoxide to lithium being ten.

EXAMPLE II

Styrene was polymerized under essentially the same conditions as described in Example I, to form a living polymer polystyrene-Li having an average molecular weight of about 32,000. Carbon monoxide was introduced into the resulting solution at a temperature of about 23 to 45° C. for about 40 minutes to form a highly coupled product having an average molecular weight in the order of 62,000.

We claim as our invention:

1. A process for the preparation of polymers of increased molecular weight which comprises reacting at a temperature in the range of 0° to 75° C. a terminally reactive polymer $[P(Y)_n]$ $P(Li)_n$ wherein P comprises a polymer of polymerizable vinylidene compounds selected from the group consisting of homopolymers and copolymers of conjugated dienes having from 4 to 12 carbon atoms and monovinyl arenes, Li is terminally positioned and $n$ is an integer of 1 to 4, with from 0.5 to 25 equivalents of carbon monoxide per equivalent of lithium.

2. A process according to claim 1 wherein $n$ is 1.

3. A process according to claim 2 wherein the polymer P is a homopolymer of a conjugated diene.

4. A process according to claim 2 wherein the polymer P is a homopolymer of a vinyl arene.

5. A process according to claim 2 wherein the polymer P is a block copolymer of a conjugated diene and a vinyl arene.

6. A process for the preparation of polymers of increased molecular weight which comprises reacting in a hydrocarbon solvent at a temperature within the range of +15° C. to 65° C. a terminally reactive block copolymer having the general configuration polystyrene-polybutadiene-Li with from 0.75 to 15 equivalents of carbon monoxide per equivalent of Li.

7. A process for the preparation of polymers of increased molecular weight which comprises reacting in a hydrocarbon solvent at a temperature within the range of +15° C. to 65° C. a terminally reactive block copolymer having the general configuration polystyrene-polyisoprene-Li with from 0.75 to 15 equivalents of carbon monoxide per equivalent of Li.

References Cited
UNITED STATES PATENTS
3,135,716 6/1964 Uraneck et al. _____ 260—880
3,177,190 4/1965 Hsieh _____ 260—880 XR

OTHER REFERENCES
Ryang et al: Bulletin Chem. Soc. of Japan, vol. 35, No. 7, July 1962, pp. 1121–1124.

GEORGE F. LESMES, *Primary Examiner.*

U.S. Cl. X.R.

260—85.1, 88.3, 88.5, 89.5, 91.1, 92.8, 93.5, 94.1, 94.7, 880

UNITED STATES PATENT OFFICE
CERTIFICATE OF CORRECTION

Patent No. 3,427,364            February 11, 1969

Alfred W. Shaw et al.

It is certified that error appears in the above identified patent and that said Letters Patent are hereby corrected as shown below:

Column 6, line 46, "$[P(Y)_n]$" should read -- $P(Li)_n$ --.

Signed and sealed this 19th day of January 1971.

(SEAL)
Attest:

Edward M. Fletcher, Jr.            WILLIAM E. SCHUYLER, JR.
Attesting Officer            Commissioner of Patents